(12) United States Patent
Mischari et al.

(10) Patent No.: US 9,766,778 B2
(45) Date of Patent: Sep. 19, 2017

(54) METHOD AND APPARATUS FOR RAPID ACCESS TO A CONTACT IN A CONTACT LIST

(71) Applicant: Vonage Business Inc., Atlanta, GA (US)

(72) Inventors: Uri Mischari, Oranit (IL); Tzahi Efrati, Hoboken, NJ (US)

(73) Assignee: Vonage Business Inc., Atlanta, GA (US)

( * ) Notice: Subject to any disclaimer, the term of this patent is extended or adjusted under 35 U.S.C. 154(b) by 235 days.

(21) Appl. No.: 13/686,227

(22) Filed: Nov. 27, 2012

(65) Prior Publication Data

US 2014/0149878 A1    May 29, 2014

(51) Int. Cl.
*G06F 3/048* (2013.01)
*G06F 3/0482* (2013.01)
*H04M 1/2745* (2006.01)

(52) U.S. Cl.
CPC .... *G06F 3/0482* (2013.01); *H04M 1/274525* (2013.01); *H04M 1/274583* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 8,392,836 B1* | 3/2013 | Bau | ...... | G06Q 10/107 715/739 |
| 2005/0165715 A1* | 7/2005 | Farnham et al. | ...... | 707/1 |
| 2007/0132789 A1* | 6/2007 | Ording | ...... | G06F 3/0485 345/684 |
| 2008/0101762 A1* | 5/2008 | Kellock | ...... | G11B 27/031 386/278 |
| 2009/0177981 A1* | 7/2009 | Christie | ...... | G06F 3/04883 715/758 |
| 2010/0298034 A1* | 11/2010 | Shin | ...... | G06F 3/04883 455/566 |
| 2011/0231407 A1* | 9/2011 | Gupta | ...... | G06Q 10/10 707/748 |
| 2012/0036428 A1* | 2/2012 | Tsuda | ...... | G06F 3/048 715/252 |
| 2012/0124469 A1* | 5/2012 | Nakajima | ...... | G06F 3/04817 715/702 |

* cited by examiner

*Primary Examiner* — Thanh Vu
(74) *Attorney, Agent, or Firm* — Moser Taboada; Joseph Pagnotta

(57) ABSTRACT

A method and apparatus for displaying and accessing contacts in a contact list on a display device. In some embodiments, the method includes displaying a list of contacts on the display device, wherein the list of contacts is separated into groups of contacts by contact group separators based on at least one configuration setting, generating a quick access index including a plurality of selectable index items each associated with a group of contacts, wherein the selectable index items are only generated for the groups of contacts that include at least one contact, and displaying the quick access index over at least a portion of the list of contacts.

20 Claims, 6 Drawing Sheets

METHOD AND APPARATUS FOR RAPID ACCESS TO A CONTACT IN A CONTACT LIST

BACKGROUND OF THE INVENTION

Field of the Invention

Embodiments consistent with the present invention generally relate to methods and apparatus for displaying and accessing contacts in a contact list.

Description of the Related Art

Software applications are designed to perform many different functions and/or display many different types of information. Separate screens or pages within a single application may be required for each separate function provided, and each type of information displayed, by the application. As display devices reduce in size, the screen displays become more and more crowded to accommodate the many different functions and types of information that a user can access. For example, an address book function may include numerous contacts in the form of contact lists. Once the contact list gets too long, it becomes difficult and time consuming to have to scroll to get to a specific contact. Some solutions may include a secondary scrolling option by listing letters A-Z along a portion of a display screen to be able to jump to a specific letter (and thus contacts associated with that letter). However, these solutions may not be sufficient because the area for each of the 26 letters may be very small and difficult to select a specific letter. In addition, these solutions also are unhelpful for users with contacts in several languages/alphabets. Furthermore, these solutions are insufficient because each letter may include scores of contacts and a user must still scroll through many contacts to find the desired contact.

Thus there is a need for a method and apparatus to provide a better way of organizing, displaying and accessing contacts in a contact list.

SUMMARY OF THE INVENTION

A method and apparatus for displaying and accessing contacts in a contact list on a display device. In some embodiments, the method includes displaying a list of contacts on the display device, wherein the list of contacts is separated into groups of contacts by contact group separators based on at least one configuration setting, generating a quick access index including a plurality of selectable index items each associated with a group of contacts, wherein the selectable index items are only generated for the groups of contacts that include at least one contact, and displaying the quick access index over at least a portion of the list of contacts.

In some embodiments, an apparatus for displaying and accessing contacts in a contact list on a display device includes at least one processor, at least one input device, and at least one storage device storing processor executable instructions which, when executed by the at least one processor, perform a method including displaying a list of contacts on the display device, wherein the list of contacts is separated into groups of contacts by contact group separators based on at least one configuration setting, generating a quick access index including a plurality of selectable index items each associated with a group of contacts, wherein the selectable index items are only generated for the groups of contacts that include at least one contact, and displaying the quick access index over at least a portion of the list of contacts.

In some embodiments, a non-transient computer readable medium for storing computer instructions that, when executed by at least one processor causes the at least one processor to perform a method for displaying and accessing contacts in a contact list on a display device, includes displaying a list of contacts on the display device, wherein the list of contacts is separated into groups of contacts by contact group separators based on at least one configuration setting, generating a quick access index including a plurality of selectable index items each associated with a group of contacts, wherein the selectable index items are only generated for the groups of contacts that include at least one contact, and displaying the quick access index over at least a portion of the list of contacts.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
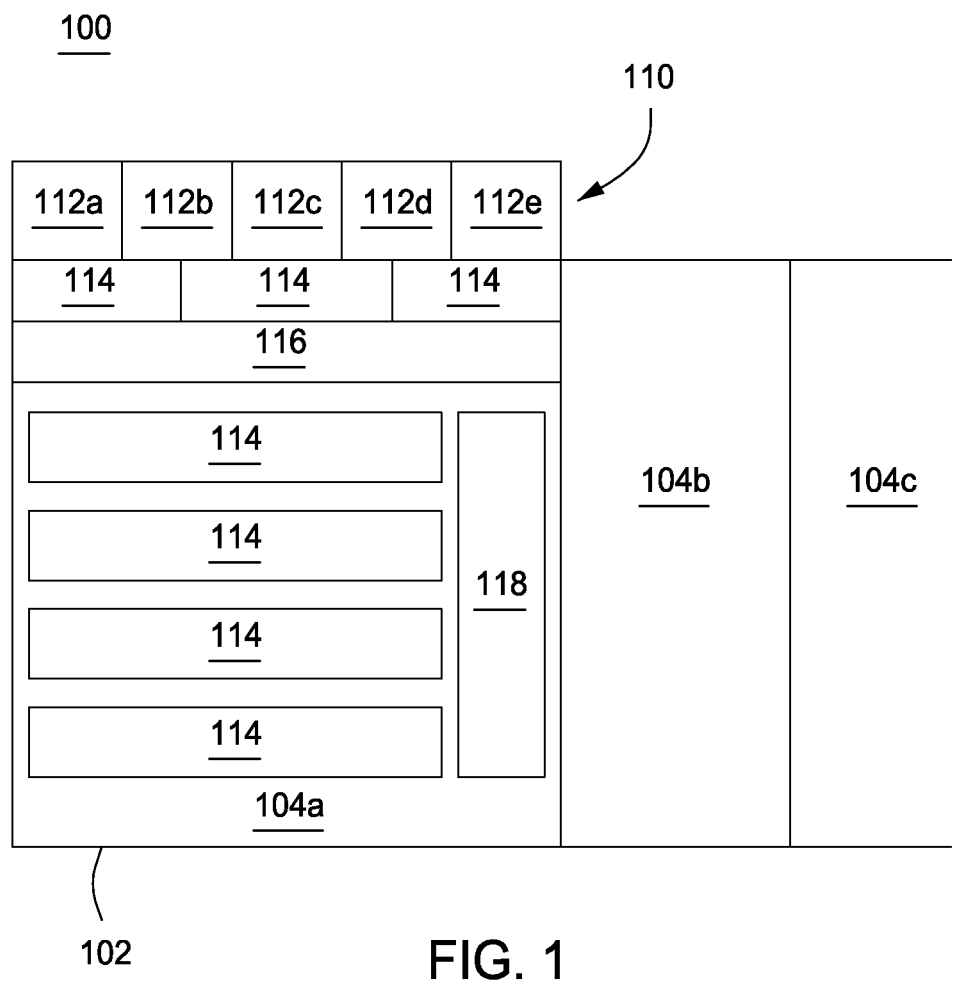
FIG. 1 depicts an exemplary user interface in accordance with embodiments consistent with the present application.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a method and apparatus for organizing, displaying and accessing contacts in a contact list. Exemplary embodiments described herein provide additional flexibility in the way an index of a contact list is displayed on a mobile device, for example, so that it is easier to identify and access a contact.

Various embodiments of an apparatus and method for organizing, displaying and accessing contacts in a contact list are provided below. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts an exemplary user interface 100 in accordance with embodiments consistent with the present application.

The user interface 100 may include a defined viewable area 102 which can be scrolled. The scrollable viewable area 102 may display a plurality of pages 104a-104c, including various functional or informational pages, to a user.

In some embodiments, functional pages 104a-104c may include user selectable objects 114 to facilitate the desired functionality. For example, page 104a may include contact information and tools that consist of a plurality of selectable objects 114, a search object 116, and a quick access index 118 to facilitate the selecting and communicating with a desired contact. According to some embodiments, functional pages 104a-104c may include a dialer (not depicted) to facilitate the dialing of phone numbers, a chat page for interacting with another person via chat, an account balance page for checking account balances and adding additional funds to a user's account, and the like. Although only three pages 104a-c are depicted, more or less pages may be used.

According to some embodiments, at least some of the plurality of pages 104a-104c may include static or dynamic information for display to the user. For example, in some embodiments, at least some of the plurality of pages 104a-104c may display information such as recently called phone numbers or contacts.

A user may scroll between the plurality of pages 104a-104c using a number of input methods. In some embodiments consistent with the present application, a user may swipe a touch-sensitive screen to scroll from page to page in user interface 100. In other embodiments, a user may use a mouse input to select a specific page. User interface 100 may also include a menu area 110 which may include a plurality of selectable menu objects 112a-112e. Each menu object 112a-112e may take a user to a specific page when selected. In some embodiments, menu area 110 may be fixed such that it does not scroll as a user scrolls between pages 104a-104c. In other embodiments, menu area 110 may be separately scrollable such that it can be scrolled to display additional selectable menu objects, but scrolls independently from pages 104a-104c.

Figure 2A:
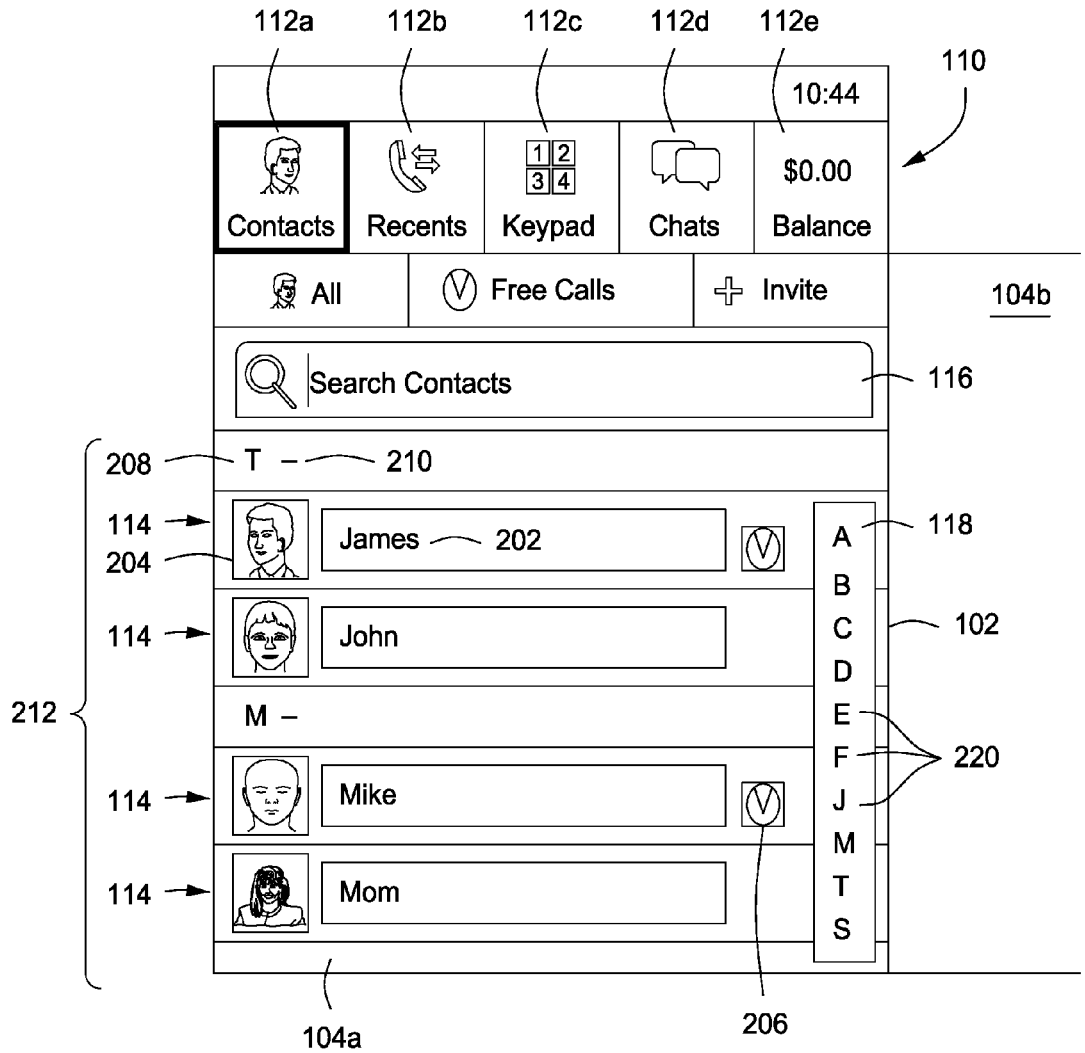
FIGS. 2A and 2B depicts an exemplary contact list in accordance with the least one embodiment of the present invention.
Figure 2B:
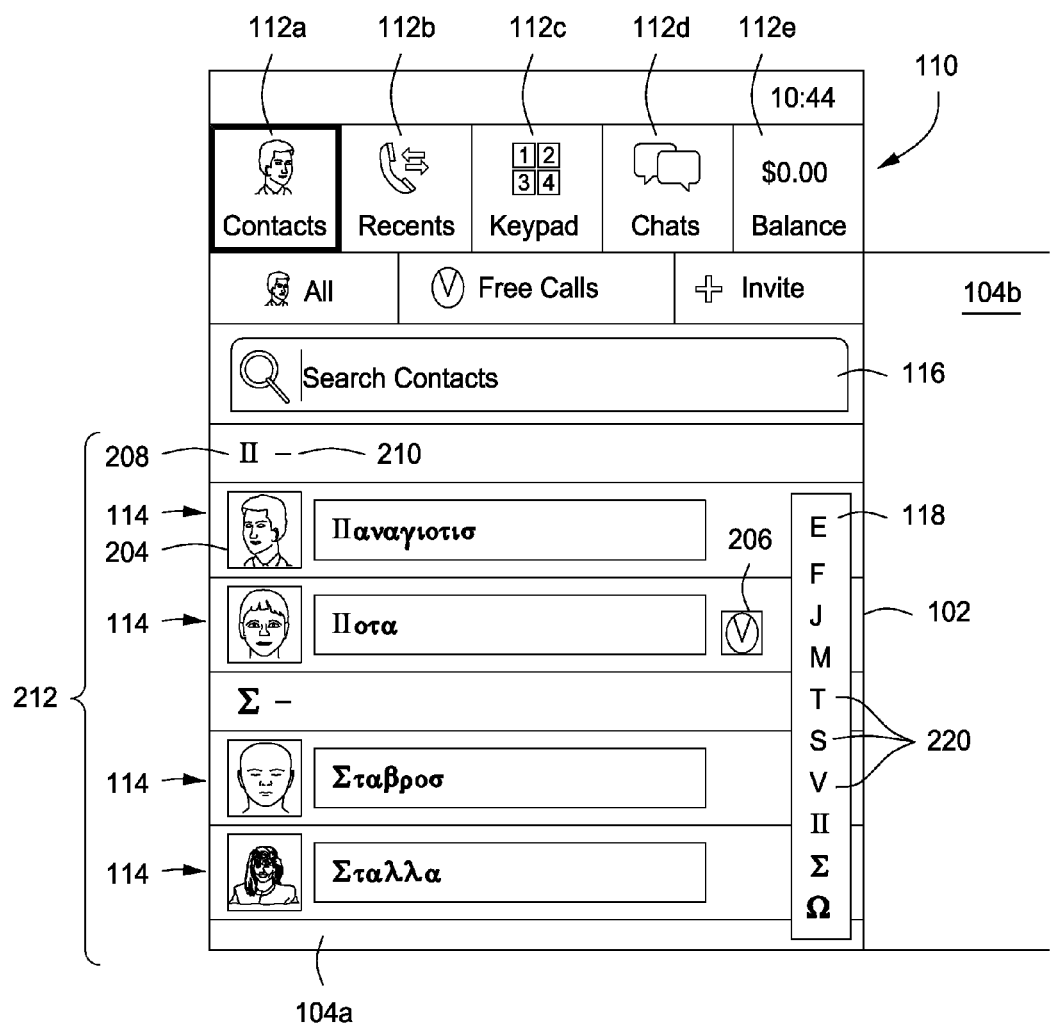

FIGS. 2A and 2B depict example embodiments of a contact information page 104a in viewable area 102. The contact information page includes a plurality of contact objects 114. In some embodiments, each contact object may be selectable. Each selectable contact object may include a contact name object 202, a contact image object 204, and an additional information object 206. In some embodiments, the contact names 202 may be in one or more languages/alphabets. In addition, the contact names 202 may also be begin with, or include, one or more numbers, punctuation marks, non-alphanumeric characters, or any other type of displayable character. In some embodiments, the additional information object 206 may provide an indication that the contact uses the same communication service as the user. The contact information page 104a may also include a search object 116 that can be used to search the contact names 202, or other information associated with each contact. The contact information page 104a includes a plurality of contact group separators 208 that separate and group contacts based on some common characteristic between the contacts. The contact group separators 208 include descriptive text that may also be in any language/alphabet and may begin with, or include, one or more numbers, punctuation marks, non-alphanumeric characters, or any other type of displayable character. In some embodiments, the descriptive text of the contact group separators 208 may correspond to the common characteristic between the contacts. For example, the descriptive text of the contact group separators 208 may be based on the contact names (e.g., the first X characters of the contact name), the contact addresses (e.g., group be city), contact business, and the like. The plurality of contact objects 114 and contact group separators 208 form a contact list 212 that is scrollable. The contact list 212 may be scrolled, for example (but not limited to), from top to bottom, bottom to top, right to left, or left to right.

In some embodiments, contacts may be automatically grouped and separated by contact group separators 208 based on, for example, the first X character(s) that the contact name begins with. In some embodiments, the default value for X may be 1 character. For example, FIG. 2A shows all contacts beginning with the English letter "J" are grouped under the "J" contact group separator 208 and all contacts beginning with the English letter "M" are grouped under the "M" contact group separator 208. Similarly, FIG. 2B shows all contacts beginning with the Greek letter "Π" are grouped under the "Π" contact group separator 208 and all contacts beginning with the Greek letter "Σ" are grouped under the "Σ" contact group separator 208. As shown in FIGS. 2A and 2B, the contact group separators 208 will display the grouping characteristic associated with the group. Thus, in some embodiments, the contact group separators 208 may display the first character of the groups they represent, which may be in any language/alphabet, and may include alphanumeric characters, non-alphanumeric characters, or any other type of displayable character. In addition, in some embodiments consistent with the present invention, only contact group separators 208 that have contacts associated with them will be displayed. For example, as shown in FIG. 2A, since no contacts exist with a contact name that begins with the letters "K" and "L", contact group separators 208 for "K" and "L"

are not created or displayed. That is, in some embodiments, contact group separators 208 are created and displayed only when at least one contact is associated with a group indicated by the contact group separator 208.

Figure 3:
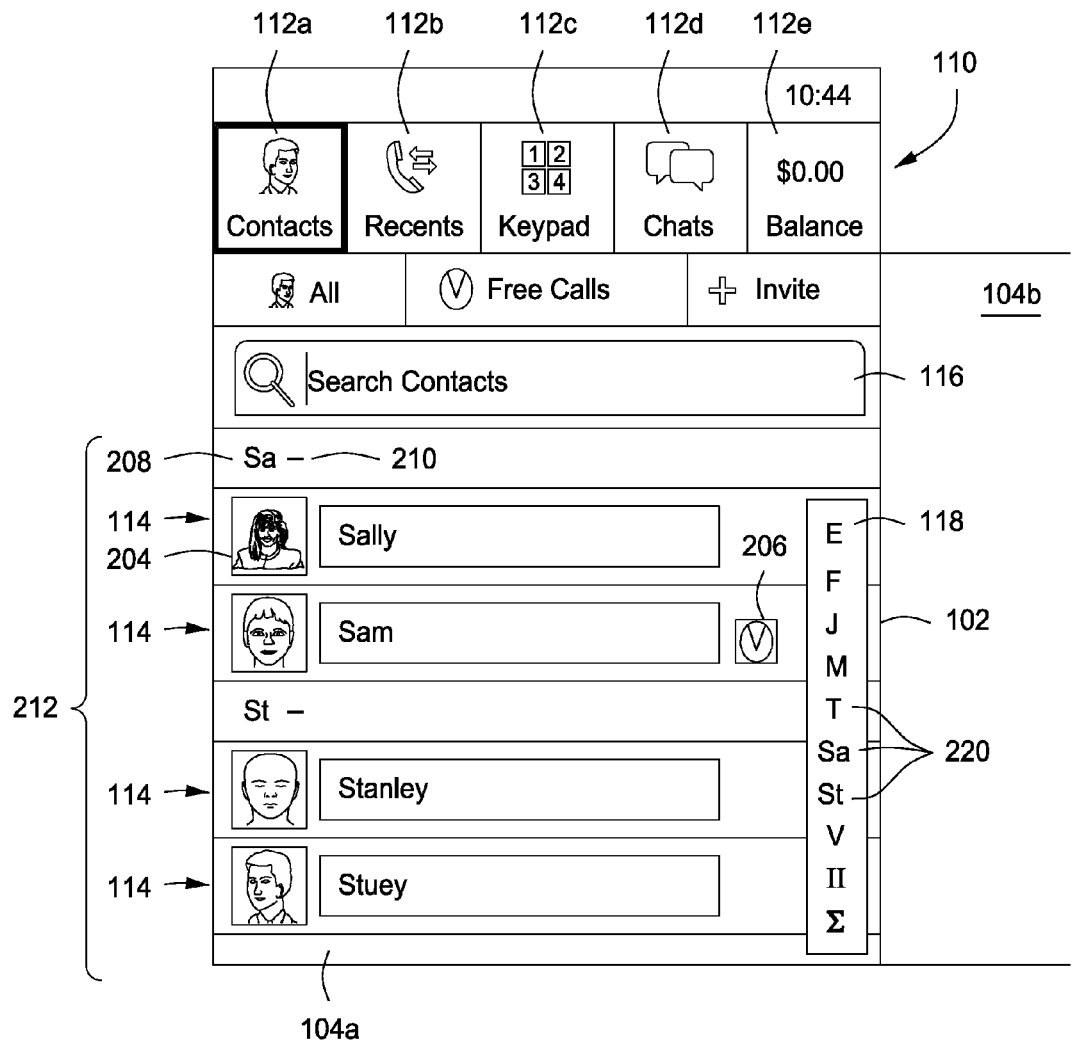
FIG. 3 depicts another exemplary contact list, according to one or more embodiments of the invention.

In other embodiments, contacts may be separated and grouped by the contact group separators 208 based on configuration parameters set by the user. For example, a user may specify to group contacts based on the first 2 characters of the contact name as shown in at least one embodiment consistent with FIG. 3. As shown in FIG. 3, all contacts beginning with the English letters "Sa" are grouped under the "Sa" contact group separator 208 and all contacts beginning with the English letter "St" are grouped under the "St" contact group separator 208. In some embodiments, contacts may be dynamically separated and grouped by the contact group separators 208 based on the first X characters of the contact name, for example, where X is dynamically determined such that it keeps the number of contacts within a group of contacts to a predefined value (set by default, or by a user).

In further embodiments, each contact group separator 208 may also include a selectable object 210 (e.g., in the form of a "+" or "−" character) that can be selected to either expand the group to show all contacts 202 associated with the group, or to collapse the group to only display the contact group separator 208 while hiding the specific contacts associated with the group. In some embodiments, contact groups may be expanded or collapsed by tapping on the contact or by other gestures such as pinching or spreading fingers apart over a contact on a touch screen of the display device. A user may set a maximum number of collapsed contact group separator entries to appear in a top level contact list. The user may also specify the maximum number of entries to appear in any single un-collapsed list. Based on the user parameters set by the user, groupings of contacts (and the associated contact group separators 208) may be dynamically generated.

In addition to the embodiments described above, contacts may also be automatically or manually grouped by a calling frequency, user specified favorites list, family, work contacts, friends, time of day (e.g., dynamically place work contacts at top of contact list during work hours), or location (e.g., dynamically place work contacts at top of contact list when geolocation information indicates a user is at work), and the like. For each grouping, a corresponding contact group separator 208 would be created and displayed with the associated contacts in each group.

In some embodiments, the contact group separators 208 are sorted and displayed alphabetically. Similarly, in some embodiments, the contact objects 114 associated with each contact group separator 208 are sorted alphabetically beneath the contact group separator 208 by the contact names 202. For example, in FIG. 2A, contacts "James" and "John" are sorted alphabetically beneath contact group separator "J". In other embodiments, the contact group separators 208, and the contact objects 114 associated with each contact group separator 208, are sorted based on calling frequency. That is, groups with contacts that were called the most would be placed at the top of the contact list.

As shown in FIGS. 1-3, the contact information page 104a also includes quick access index 118. Quick access index 118 may be disposed along a portion of a display screen including over a portion of contact list 112. Quick access index 118 may be used to jump to a specific contact object 114 (i.e., to display a specific contact or contact group in the display area 102). In some embodiments, the quick access index 118 includes an entry for each contact group created and separated by contact group separator 208. Specifically, a selectable index item 220 is created and displayed in the quick access index 118 only when at least one contact is associated with a group indicated by the contact group separator 208. Selectable index items 220 may be created and sorted similar to the contact group separators 208 discussed above. The selectable index items 220 include descriptive text which may be in any language/alphabet and also begin with, or include, one or more numbers, punctuation marks, non-alphanumeric characters, or any other type of displayable character. In some embodiments, the descriptive text of the selectable index items 220 may correspond to a common characteristic between the contacts similar to the contact group separators 208 discussed above. For example, the descriptive text of the selectable index items 220 may be based on the contact names (e.g., the first X characters of the contact name), the contact addresses (e.g., group by city), contact business, and the like. In some embodiments, selectable index items 220 are ordered/sorted to correspond with the order of associated contact group separators 208. In other embodiments, the order of selectable index items 220 within quick access index 118 may be different than the order of the groups of contacts and associated contact group separators 208. For example, the selectable index items 220 may be ordered based on the number of contacts associated with each selectable index item 220, or by frequency of calling to contacts associated with each selectable index item 220.

The index items 220 displayed in quick access index 118 are variably sized to maximize the available viewable area of the quick access index 118. As more contacts are added or removed, the size of index items 220 may automatically be resized to fit the available viewable area of the quick access index 118. A minimum size for index items 220 may be set by the user or by default. If more index items 220 exist than can be display based on the minimum size set, the quick access index 118 becomes scrollable. Once the quick access index 118 is scrollable, it will re-align its scroll amount according to the user position inside the contact list. As the user scrolls down the contact list 112, the quick access index 118 will continue to scroll alongside the contact list 112. In some embodiments, the size of index items 220 may be based on the number of contacts in each group. For example, a contact group with 10 contacts associated with it may have a larger sized index item 220 in quick access index 118 than a contact group with only 1 contact associated with it.

In some embodiments, pressing and sliding of the user's finger along the quick access index 118 will scroll the contact list 112 directly to the index item 220 the user's finger is disposed over in the quick access index 118. If the touch location is between index characters 220, the contact list 112 will scroll to the middle contact between the corresponding contact group separators 208. For example, if there are 10 contacts starting with the letter "A" and the user touching quick access index 118 between index character 220 "A" and "B", the contact list will set the 5th contact at its top, since it is the "middle" contact of that group.

In some embodiments, as the user slides their finger along quick access index 118, the index character 220 the user's finger is proximate to will also be prominently displayed substantially near the center of visible area 102 in a separate screen object (not shown). The background color of the separate screen object will be different from that of visible area 102 and the size of the character displayed in the separate screen object will be much larger than the size of the index characters 220 displayed in quick access index 118. This allows the user to verify the character their finger is positioned over in the quick access index 118.

Figure 4:
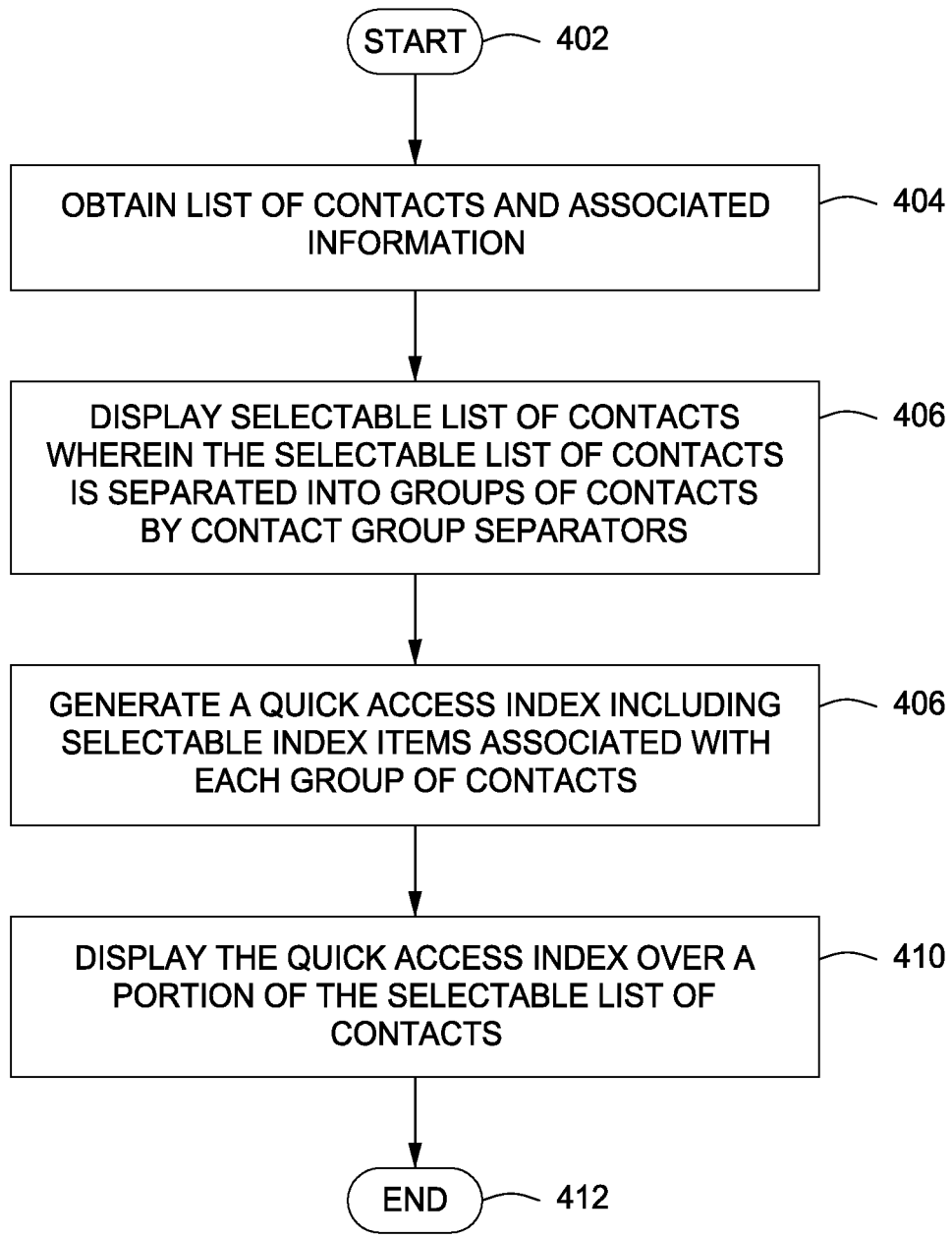
FIG. 4 depicts a flow diagram of a method for scrolling between a plurality of pages on a display device, according to one or more embodiments of the invention.

FIG. 4 depicts a flow diagram of a method 400 for displaying and accessing contacts in a contact list, according to one or more embodiments of the invention. The method 400 starts at 402, and generally proceeds to 404.

At 404, a list of contacts and associated contact information is obtained. In some embodiments, the list of contacts and associated contact information may be obtained from another application and/or storage location located on the user's device. In other embodiments, the contacts may be entered by the user or obtained from a central server associated with a communication service used by the user on the user's device. After the list of contacts is obtained, a selectable list of contacts and associated contact information is displayed on the display device at 406. The selectable list of contacts may be separated into groups of contacts by contact group separators 208 based on at least one configuration setting, such that each group of contacts includes at least one contact. The configuration settings may be default settings, or may be manually set by the user. As discussed above, contacts may be automatically grouped and separated by contact group separators 208 based on, for example, the first X character(s) that the contact name begins with. At 408, a quick access index 118 including selectable index items 220 associated with each group of contacts is generated. The selectable index items 220 are only generated for the groups of contacts that include at least one contact. Selecting an index item 220 in the quick access index 118 causes the display device to display contacts of the group of contacts associated with the index item 220. The list of contacts, contact group separators 208 and quick access index 118 may automatically be updated for contacts that have been added, edited, or removed. In addition, in some embodiments, a notification may be received for contacts that have been added, edited, or removed, and the list of contacts, contact group separators 208 and quick access index 118 may automatically be updated based on the notification received. At 410, the quick access index is displayed over a portion of the selectable list of contacts in visible area 102. The method 400 then ends at step 412.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java™, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
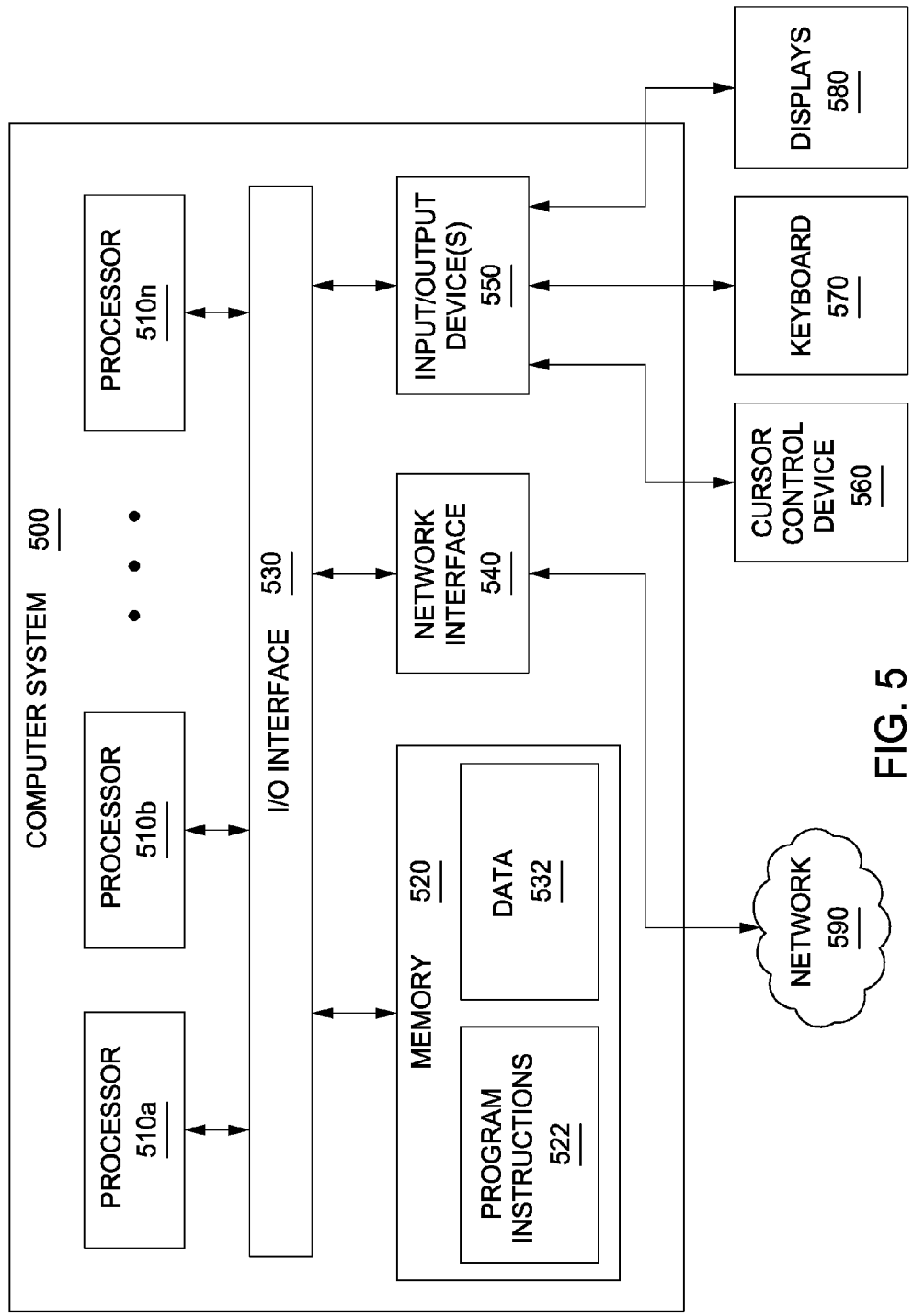
FIG. 5 is a detailed block diagram of a computer system, according to one or more embodiments.

FIG. 5 depicts a computer system 500 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 500 illustrated by FIG. 5, which may in various embodiments implement any of the elements or functionality illustrated in FIGS. 1-7. In various embodiments, computer system 500 may be configured to implement methods described above. The computer system 500 may be used to implement any other system, device, element, functionality or method of the above-described embodiments. In the illustrated embodiments, computer system 500 may be configured to implement method 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface (e.g., user interface 100) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The foregoing description of embodiments of the invention comprises a number of elements, devices, circuits and/or assemblies that perform various functions as described. For example, one or more processors 510a-510n, I/O Interface 530, and Memory 520 are examples of a means for obtaining a list of contacts and associated information. Display 580 is an example of a means for displaying a list of contacts. One or more processors 510a-510n may be used to separate the list of contacts into groups of contacts using contact group separators based on at least one configuration setting. Similarly, one or more processors 510a-510n may be used, for example, to generate quick access index 118 including selectable index items 220 associated with each group of contacts. Display 580 is an example of a means for displaying the quick access index over at least a portion of the selectable list of contacts in visible area 102. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow. For example, although described above in terms of contact lists, group separates and quick access indexes may be used for other types of lists of items such as inventories, expenses, countries, addresses, and the like.

What is claimed is:

1. A computer-implemented method for displaying and accessing contacts in a contact list on a display device associated with a computer, the method comprising:
    displaying a list of contacts on the display device, wherein the list of contacts is separated into groups of contacts by contact group separators based on at least one configuration setting;
    generating a quick access index including a plurality of selectable index items each associated with a group of contacts, wherein the selectable index items are only generated for the groups of contacts that include at least one contact,
    ordering the selectable index items within the quick access index based on a number of contacts associated with each selectable index item; and
    displaying the ordered quick access index over at least a portion of the list of contacts, wherein the displayed ordering is based on the number of contacts associated with each selectable index item.

2. The computer-implemented method of claim 1, wherein selecting an index item in the quick access index causes the display device to display contacts of the group of contacts associated with the index item.

3. The computer-implemented method of claim 1, wherein the selectable index items are dynamically sized on the display device based on the number of selectable index items in the quick access index.

4. The computer-implemented method of claim 1, wherein a display size of each of the selectable index items is greater than or equal to a minimize display size set, and wherein the quick access index becomes scrollable when the selectable index items in the quick access index cannot all be displayed in the quick access index at least at the minimize display size set.

5. The computer-implemented method of claim 1, wherein a display size of each of the selectable index items is based on a number of contacts associated with the selectable index item.

6. The computer-implemented method of claim 1, wherein the selectable index items are ordered within the quick access index based on at least one of a calling frequency to contacts associated with each selectable index item, or user defined parameters, wherein user defined parameters comprise at least one of a user specified favorites list, family, or work contacts.

7. The computer-implemented method of claim 1, wherein the selectable index items are in two or more different alphabets.

8. The computer-implemented method of claim 1, wherein at least some of the contacts in the list of contacts each include a contact name, wherein the at least some of the contacts are automatically separated into one or more groups of contacts based on the first X characters that each contact's contact name begins with, wherein X is two or more.

9. The computer-implemented method of claim 8, where X is dynamically determined such that the number of contacts within a group of contacts stays at or below a predefined value.

10. The computer-implemented method of claim 1, wherein each contact group separator includes a selectable object which, when selected, collapses an un-collapsed group of contacts associated with the contact group separator.

11. The computer-implemented method of claim 1, wherein each contact group separator includes a selectable object which, when selected, expands a collapsed list of contacts associated with the contact group separator.

12. The computer-implemented method of claim 11, wherein each of a maximum number of collapsed contact group separators to display in a contact list and a maximum number of contacts that may comprise a contact group is set by default or by a user, and wherein groupings of contacts and the associated contact group separators are dynamically generated based on the maximum number of collapsed contact group separators and the maximum number of contacts that may comprise a contact group.

13. An apparatus for displaying and accessing contacts in a contact list on a display device, comprising:
  a) at least one processor;
  b) at least one input device; and
  c) at least one storage device storing processor-executable instructions which, when executed by the at least one processor, performs a method including
   (1) displaying a list of contacts on the display device, wherein the list of contacts is separated into groups of contacts by contact group separators based on at least one configuration setting,
   (2) generating a quick access index including a plurality of selectable index items each associated with a group of contacts, wherein the selectable index items are only generated for the groups of contacts that include at least one contact;
   (3) ordering the selectable index items within the quick access index based on a number of contacts associated with each selectable index item, and
   (4) displaying the ordered quick access index over at least a portion of the list of contacts, wherein the displayed ordering is based on the number of contacts associated with each selectable index item.

14. The apparatus of claim 13, wherein selecting an index item in the quick access index causes the display device to display contacts of the group of contacts associated with the index item.

15. The apparatus of claim 13, wherein the selectable index items are dynamically sized on the display device based on the number of selectable index items in the quick access index.

16. The apparatus of claim 13, wherein a display size of each of the selectable index items is greater than or equal to a minimize display size set, and wherein the quick access index becomes scrollable when the selectable index items in the quick access index cannot all be displayed in the quick access index at least at the minimize display size set.

17. The apparatus of claim 13, wherein a display size of each of the selectable index items is based on a number of contacts associated with the selectable index item.

18. The apparatus of claim 13, wherein the selectable index items are ordered within the quick access index based on at least one of a calling frequency to contacts associated with each selectable index item, or user defined parameters, wherein user defined parameters comprise at least one of a user specified favorites list, family, or work contacts.

19. The apparatus of claim 13, wherein at least some of the contacts in the list of contacts each include a contact name, wherein the at least some of the contacts are automatically separated into one or more groups of contacts based on the first X characters that each contact's contact name begins with, wherein X is two or more.

20. A non-transitory computer readable medium for storing computer instructions that, when executed by at least one processor causes the at least one processor to perform a method for displaying and accessing contacts in a contact list on a display device, comprising:
  displaying a list of contacts on the display device, wherein the list of contacts is separated into groups of contacts by contact group separators based on at least one configuration setting;
  generating a quick access index including a plurality of selectable index items each associated with a group of contacts, wherein the selectable index items are only generated for the groups of contacts that include at least one contact,
  ordering the selectable index items within the quick access index based on a number of contacts associated with each selectable index item; and
  displaying the ordered quick access index over at least a portion of the list of contacts, wherein the displayed ordering is based on the number of contacts associated with each selectable index item.

* * * * *